United States Patent
Swanson

(10) Patent No.: US 7,882,861 B2
(45) Date of Patent: Feb. 8, 2011

(54) VACUUM STORAGE SYSTEM

(76) Inventor: David C. Swanson, P.O. Box 568, Webster, WI (US) 54893

( * ) Notice: Subject to any disclaimer, the term of this patent is extended or adjusted under 35 U.S.C. 154(b) by 991 days.

(21) Appl. No.: 11/726,917

(22) Filed: Mar. 23, 2007

(65) Prior Publication Data
US 2008/0230143 A1    Sep. 25, 2008

(51) Int. Cl.
B65B 31/04    (2006.01)
B65B 31/02    (2006.01)
B65D 81/20    (2006.01)

(52) U.S. Cl. ............ 141/65; 141/7; 141/95; 99/472; 53/432

(58) Field of Classification Search .......... 141/7, 141/63–65, 83, 94, 95, 98; 99/472; 53/432, 53/510
See application file for complete search history.

(56) References Cited

U.S. PATENT DOCUMENTS 5,215,129 A * 6/1993 Berresford et al. .......... 141/65
6,530,401 B1 * 3/2003 Angehrn et al. ............ 141/64
6,886,605 B2 5/2005 Luis
6,971,418 B2 12/2005 De Costa
7,150,297 B2 * 12/2006 Nussey ..................... 141/7
7,165,581 B2 * 1/2007 Chantalat .................. 141/64
2002/0083724 A1 7/2002 Tarlow
2003/0131566 A1 7/2003 Glucksman
2006/0090427 A1 5/2006 Hau et al.
2006/0117763 A1 6/2006 Espinosa

* cited by examiner

Primary Examiner—Timothy L Maust
(74) Attorney, Agent, or Firm—Roger Belfay

(57) ABSTRACT

The vacuum storage system comprises: a vacuum pump, a vacuum bus, a control system to monitor and maintain a selected vacuum level in the vacuum bus. The control system provides system shutdown and alerts or warnings when the selected vacuum level cannot be maintained within the vacuum bus. The vacuum storage system further comprises one or more canister ports wherein each of the canister ports comprises a check valve to assure that no loss of vacuum occurs in occupied canister ports when one or more of the canister ports are unoccupied and open to ambient pressure, a manual valve, and a fitment for removably attaching a canister.

4 Claims, 5 Drawing Sheets

VACUUM STORAGE SYSTEM

CROSS REFERENCE TO RELATED APPLICATIONS

There are no applications related to this application.

STATEMENT REGARDING FEDERAL SPONSORSHIP

No invention claimed in this application was made under Federally sponsored research or development.

BACKGROUND OF INVENTION

The advantages of storing foodstuffs and other perishable products under vacuum are well known in the art. The present invention provides an effective and economical means of providing this capability for a wide variety of perishable materials, including foodstuffs wherein a number of canisters are provided for storage of a like number of distinct perishable commodities while minimizing the possibility of cross contamination. A further purpose which has proved illusive in the art is provision of a means to release the vacuum used for storage of the perishable materials, make use of a portion of these materials and restore the vacuum for preservation of the remainder of the perishable material. The present invention provides a flexible system which accomplishes these objectives.

There have been a number of classes of inventions which attempt to accomplish all or a part of these objectives. All have met with limited success usually because a narrower purpose is conceived.

U.S. Pat. No. 6,886,605 to Armando, published on May 3, 2005 is typical of a class of similar inventions whose purpose and design is limited to initial vacuum sealing of a container of a specific type. In this case, the vacuum sealing of wine bottles for later shipment and sale. Published US patent application 20030131566 by Glucksman, published on Jul. 17, 2003 is also a member of this class designed to seal lidded vessels.

U.S. Pat. No. 6,971,418 to De Costa, published on Dec. 6, 2005 is typical of a class of similar inventions whose purpose and design is limited to vacuum storage of a number of containers or material without isolation between the stored materials. In this class when vacuum is released on the chamber, the vacuum is released from all materials stored within the chamber. Published US patent application 20060090427 by Hau, et al, published on May 4, 2006, is also a member of this class but designed to maintain canisters under vacuum. Published US patent application 20060117763 by Espinosa, et al, published on Jun. 8, 2006, is also a member of this class but designed to maintain drawers within a cabinet under vacuum.

Published US patent application 20020083724 by Tarlow, published on Jul. 4, 2002, is typical of a class of similar inventions whose purpose and design is to provide vacuum storage of a number of containers or material. In this class the containers are integral to the overall system and provide a number of storage chambers each of which provides a tray for storage of perishable material. The present invention provides canisters which may are removed entirely from the system for use and cleaning.

BRIEF SUMMARY OF THE INVENTION

The vacuum storage system for storing material under vacuum comprises: a vacuum pump, a vacuum bus, a control system to monitor and maintain a selected vacuum level in the vacuum bus, the control system providing system shutdown and alerts or warnings when the selected vacuum level cannot be maintained within the vacuum bus, and one or more canister ports wherein each of the canister ports comprises a check valve to assure that no loss of vacuum occurs in occupied canister ports when one or more of the canister ports are unoccupied and open to ambient pressure, a manual valve, and a fitment for removably attaching a canister.

The vacuum pump is a fluid pump designed and configured to provide reduced pressure or vacuum at its input by removing air or any other compressible fluid from a device attached to the input.

The vacuum bus is generally a hollow structure which serves to provide a chamber connecting the vacuum pump input to the canister ports to apply the vacuum or reduced pressure supplied by the vacuum pump to one or more canister ports attached to the vacuum bus.

The control system comprises at least one vacuum sensor attached to the vacuum bus to monitor a selected vacuum level in the vacuum bus.

Each canister port comprises a check valve to assure that no loss of vacuum occurs in occupied canister ports when one or more of the canister ports are unoccupied and open to ambient pressure

DETAILED DESCRIPTION

Figure 1:
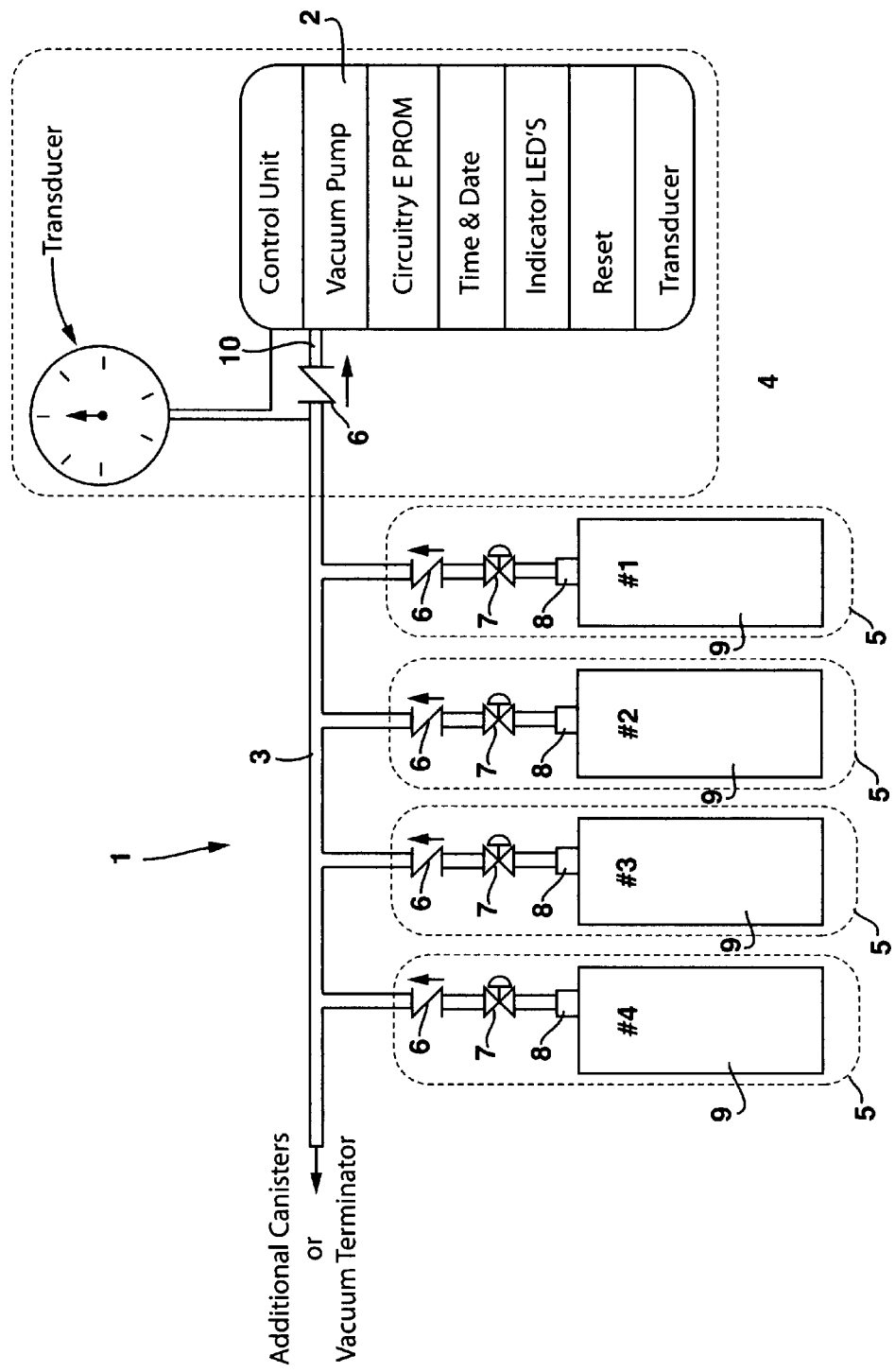
FIG. 1 is a schematic drawing of the vacuum storage system.
Figure 2:
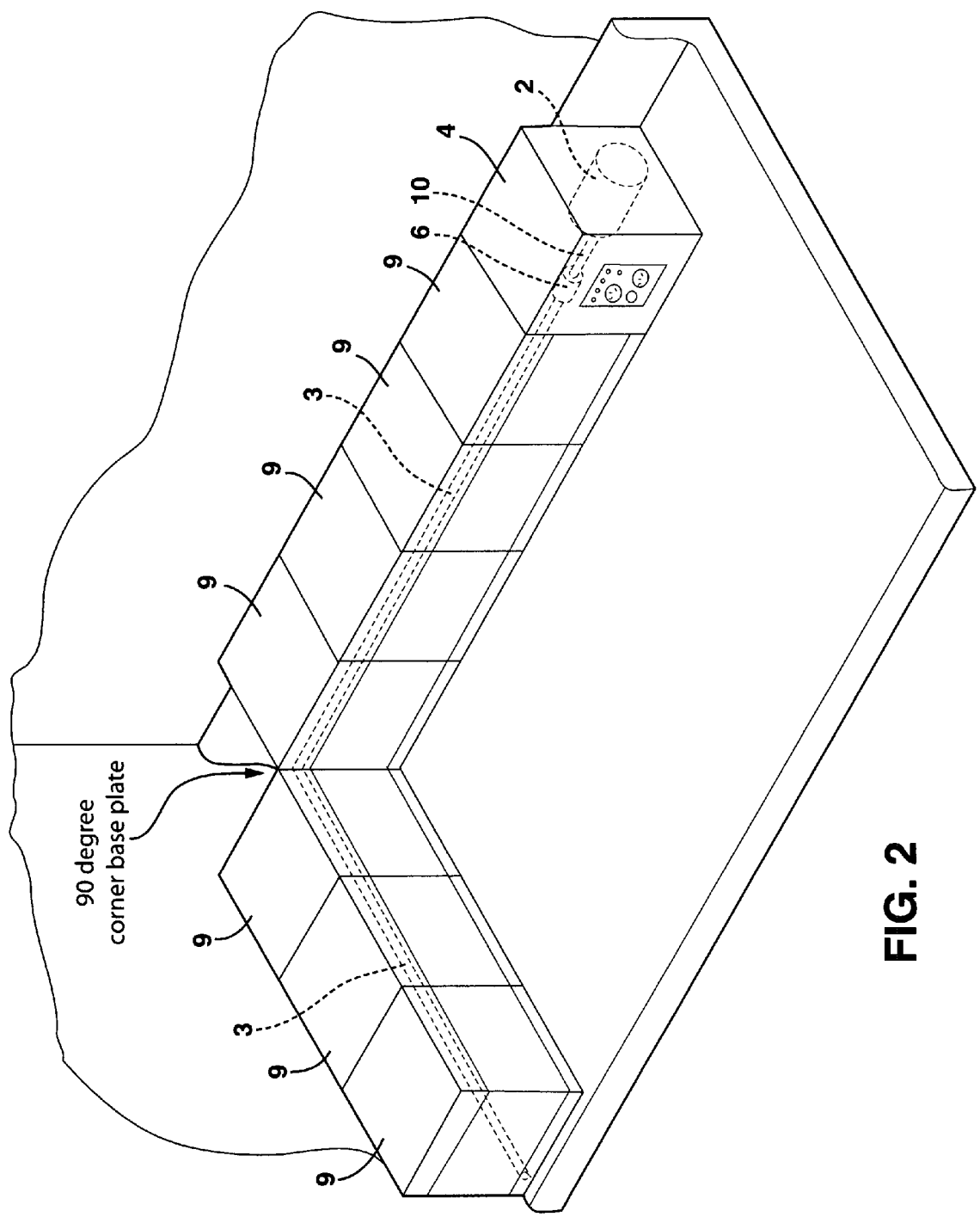
FIG. 2 is a perspective view of a counter top embodiment of the system.
Figure 3:
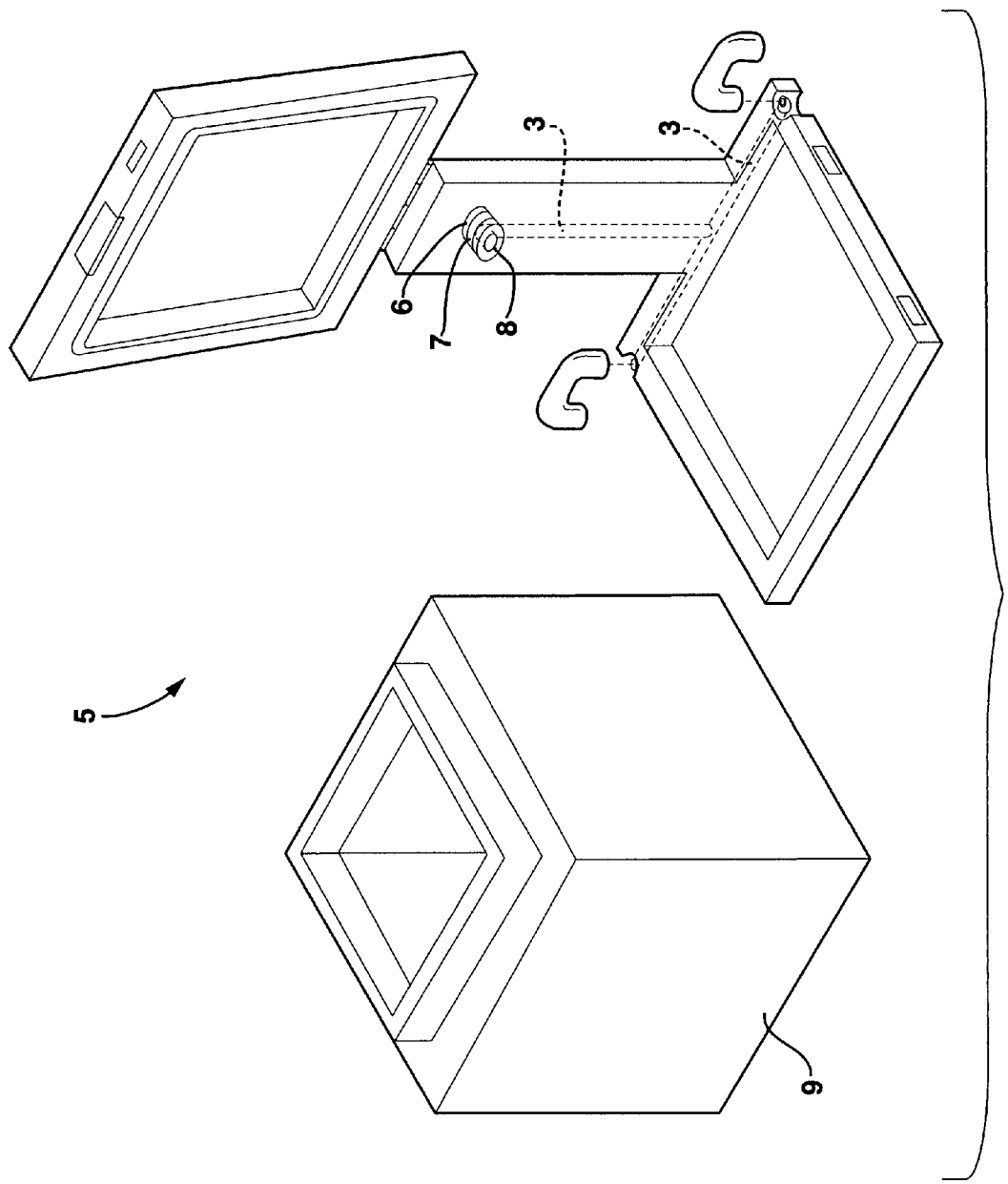
FIG. 3 is a perspective view of a typical canister port.
Figure 4:
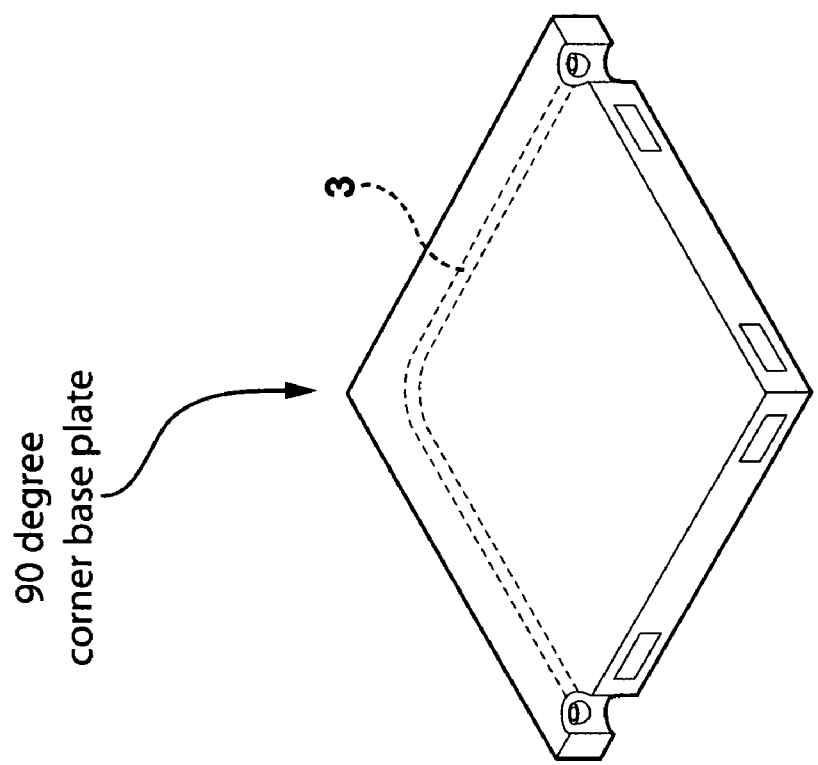
FIG. 4 is a perspective view of a 90 degree corner base plate from the counter top embodiment of the system.
Figure 5:
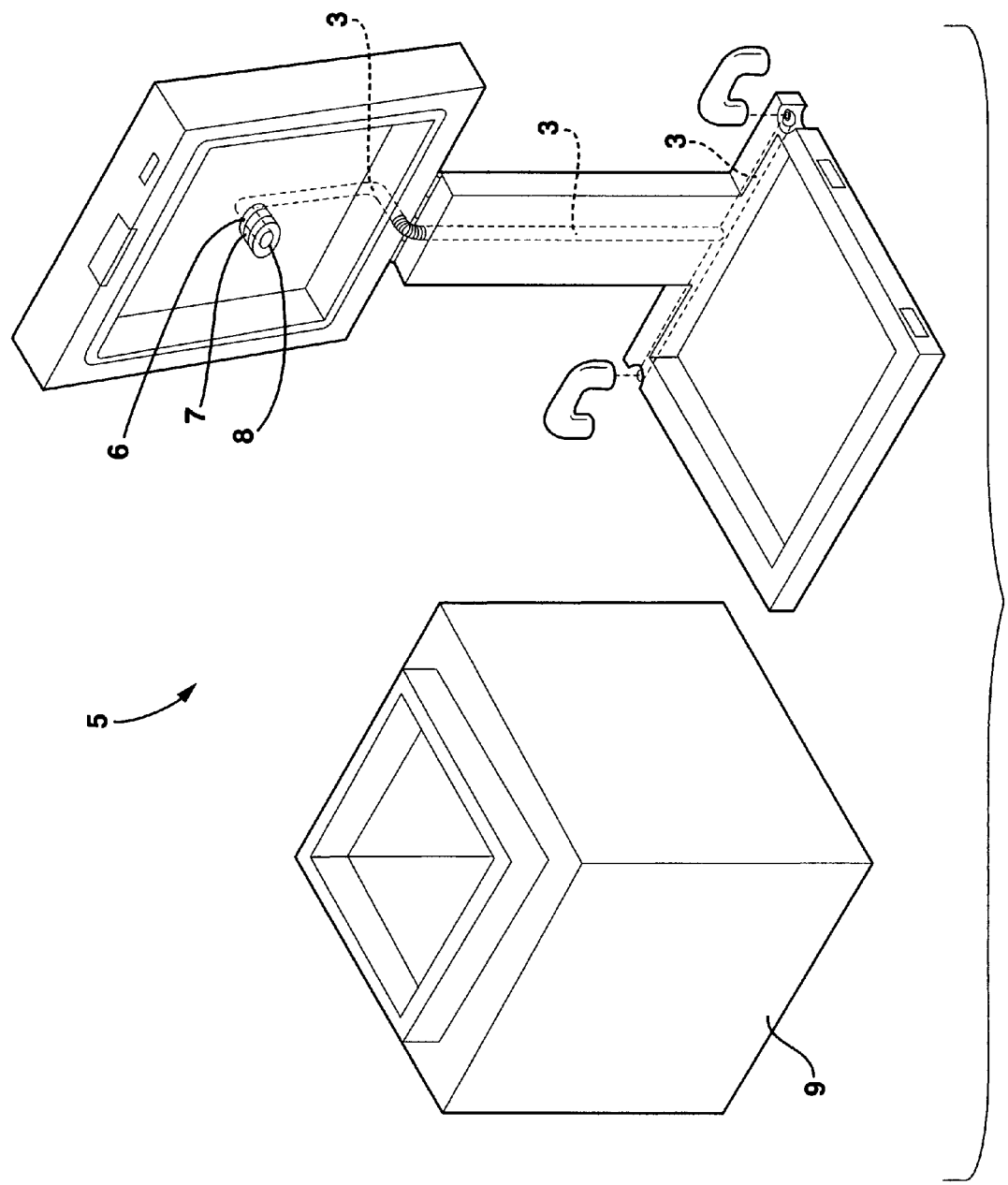
FIG. 5 is a perspective view of an alternative embodiment of a typical canister port

The vacuum storage system 1 for storing material under vacuum comprises: a vacuum pump 2, a vacuum bus 3, a control system 4 to monitor and maintain a selected vacuum level in said vacuum bus 3, said control system 4 providing system shutdown and alerts warnings when the selected vacuum level cannot be maintained within said vacuum bus 3, and one or more canister ports 5 wherein each of the canister ports 5 comprises a check valve 6 to assure that no loss of vacuum occurs in occupied canister ports 5 when one or more of the canister ports 5 are unoccupied and open to ambient pressure, a manual valve 7, and a fitment 8 for removably attaching a canister 9.

The vacuum pump 2 is a fluid pump designed and configured to provide reduced pressure or vacuum at its input by removing air or any other compressible fluid from a device attached to said input. It will be appreciated that the fluid most commonly used in the vacuum storage system 1 is air, but other compressible fluids are also contemplated and envisioned.

The vacuum bus 3 is generally a hollow structure which serves to provide a chamber connecting the vacuum pump input 10 to the canister ports 5 to apply the vacuum or reduced pressure supplied by the vacuum pump 2 to one or more canister ports 5 attached to the vacuum bus 3.

The control system 4 comprises at least one vacuum sensor attached to the vacuum bus 3 to monitor a pre-selected vacuum level in said vacuum bus 3. The control system 4 also includes suitable controls to cause the vacuum pump 2 to operate to supply vacuum to the vacuum bus 3 via the vacuum pump input 10. The control system 4 operates to enable operation of the vacuum pump 2 when the pressure in the vacuum bus 3 is above a pre-selected level thereby decreasing the pressure to a second pre-set level wherein the vacuum has been restored and further pumping is not required. As the pressure in the vacuum bus 3 increases through leakage or removal and replacement of canisters 9 the pressure within the vacuum bus 3 will increase and the cycle will repeat.

In addition said control system 4 will shutdown the vacuum pump 2 if the pre-selected vacuum level has not been restored to the vacuum bus 3 within a pre-selected time. The vacuum control system 4 may issue other system shutdown and alert warnings when the selected vacuum level cannot be maintained within said vacuum bus 3 or other anomalous conditions arise.

The canister port 5 comprises a check valve 6 to assure that no loss of vacuum occurs in occupied canister ports 5 when one or more of the canister ports 5 are unoccupied and open to ambient pressure The manual valve 7 is provided to close the canister port 5 when said canister port 5 is to be left open to the ambient atmosphere for an extended period. This is necessary because when a canister port 5 is unoccupied the vacuum bus 3 is open to the ambient environment and vacuum cannot be maintained for extended periods within the other canisters 9 nor can a canister's 9 vacuum be restored while the vacuum bus 3 is at ambient pressure.

The fitment 8 for removably attaching a canister 9 is any fitting which provides a fluid tight seal when a canister 9 is placed in the canister port 5 and permits removal and replacement of the canister 9. The fitment 8 permits the vacuum bus 3 and vacuum pump 2 to remove fluid from the canister 9 until the pressure within the interior of the canister 9 is reduced to the pre-selected vacuum level.

It is envisioned that the vacuum storage system 1 for storing material under vacuum comprises any number of canisters 9 removably attached to the vacuum bus 3 at a number of canister ports 5.

I claim:

1. A vacuum storage system for storing material under vacuum comprising:
    (a) a vacuum pump;
    (b) a vacuum bus;
    (c) a control system to monitor and maintain a selected vacuum level in said vacuum bus;
    (d) one or more canister ports wherein each of the canister ports comprises:
        a check valve to assure that no loss of vacuum occurs in occupied canister ports when said vacuum bus is exposed to ambient pressure,
        a manual valve placed between said canister and said check valve, said manual valve fluidly communicating with said canister and said check valve, and
    (e) a fitment for removably attaching a canister.

2. The vacuum storage system of claim 1 wherein said control system provides automatic system shutdown when the selected vacuum level cannot be maintained within said vacuum bus.

3. The vacuum storage system of claim 1 wherein said control system provides warnings when the selected vacuum level cannot be maintained within said vacuum bus.

4. The vacuum storage system of claim 1 wherein said control system provides alerts when the selected vacuum level cannot be maintained within said vacuum bus.

\* \* \* \* \*